United States Patent

[11] 3,573,339

[72] Inventors Robert D. Flower
  Stow;
  William A. Hinkle, Akron, Ohio
[21] Appl. No. 844,430
[22] Filed July 24, 1969
[45] Patented Apr. 6, 1971
[73] Assignee The United States of America, as represented by the Secretary of the Navy

[54] DIGITAL ELECTRONIC GROUND RETURN SIMULATOR
5 Claims, 1 Drawing Fig.

[52] U.S. Cl. .................................................... 35/10.4
[51] Int. Cl. .................................................... G09b 9/00
[50] Field of Search ........................................ 35/10.4

[56] References Cited
UNITED STATES PATENTS
3,294,891 12/1966 Antul et al. .................. 35/10.4
3,435,452 3/1969 Kilpatrick ..................... 343/6

Primary Examiner—Richard A. Farley
Assistant Examiner—Malcolm F. Hubler
Attorneys—Joseph C. Warfield, John W. Pease and John F. Miller ABSTRACT: A radar simulator training device for training radar operators which utilizes the output of an antenna azimuth scan detector to select one of a plurality of stored programs of an azimuth sector of terrain. The selected program controls the gain of a variable gain amplifier in order to vary the ground return noise generator input to the amplifier. The output of the amplifier is then applied to the training display through various other circuitry.

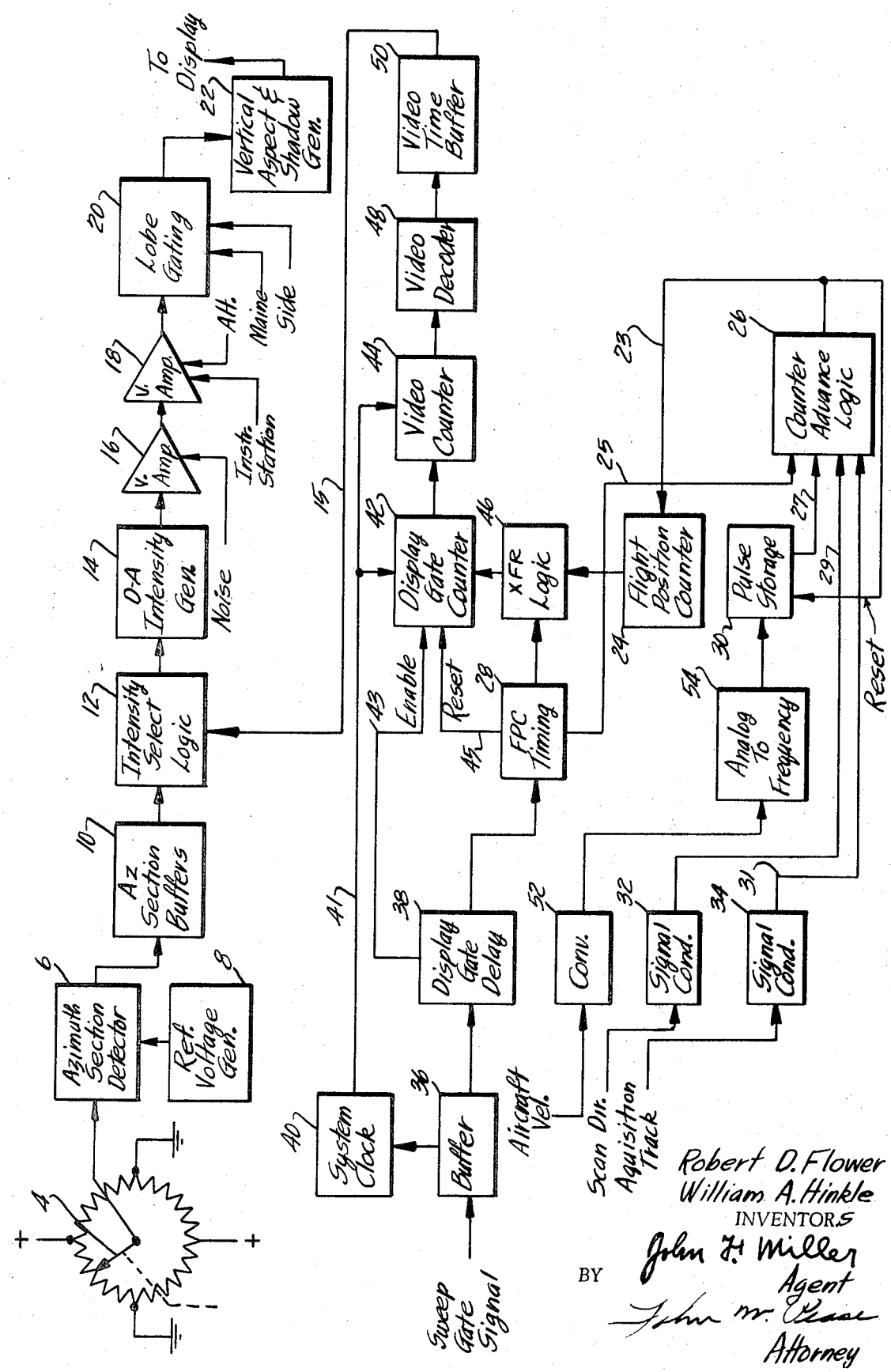

DIGITAL ELECTRONIC GROUND RETURN SIMULATOR

BACKGROUND OF THE INVENTION

The invention is in the field of radar simulator training devices. Training devices are known which simulate the conditions necessary to present a realistic display on a radar training display scope which is used to train radar operators. The effects of sea return, electronic countermeasures, etc., are realistically presented on the display. However, complete realism has been missing from radar simulators of the prior art because prior to applicants' invention, no completely satisfactory means for simulating the effect of ground return were known. Prior art devices utilizing expedients such as the scanning of transparency analogues of terrain features with photoelectric transducers, the scanning of relief maps with sonic transducers, etc., have been afflicted with disadvantages such as excessive complexity, costs, and lack of realism. Applicant solves this problem of the prior art by adding ground return effects to the display in a radar simulator by means of wired programs selectable to simulate any desired terrain together with novel selecting and utilizing circuitry.

SUMMARY OF THE INVENTION

Improved means are provided for developing signals to simulate the effect of ground return clutter on the display scope of a radar simulator training device.

Storage and selecting means are provided for a plurality of programs each representing the topography of a respective azimuthal section of terrain. A selected program is combined with variables such as aircraft velocity, position, etc., and used to modulate a noise signal. The modulated noise is modified by other variables and presented on the display scope as ground clutter.

BRIEF DESCRIPTION OF THE DRAWING

The drawing is a block diagram of the invention.

DESCRIPTION OF THE PREFERRED EMBODIMENT

Operational radar systems must be designed to operate in an environment which includes the effects of sea return, ground return, electronic countermeasures, and other effects. A training device for training radar system operating personnel must simulate all of the adverse effects of such environment in order to give a trainee experience equivalent to real-life radar operation. Heretofore, radar simulator training devices have lacked a satisfactory means for simulating ground return, the clutter on the radar scope caused by the radar beam striking the ground.

The invention provides novel apparatus for adding the effects of ground return clutter to a radar simulator display. This apparatus comprises means for storing programs which represent particular land areas and means for modifying the radar display in accordance with these programs. Means are provided to modify the effect of the land area program on the radar display in accordance with a simulated aircraft heading, position, altitude, etc., using information generated in the simulator.

Now referring to the drawing, a potentiometer winding 2 with voltage and ground connections as shown has an arm 4 which sweeps the winding to develop a voltage signal representing an antenna scan. This signal is fed into an azimuth section detector 6. The azimuth section detector receives a reference voltage from a reference voltage generator 8. By comparing the antenna scan voltage signal with the reference voltage from 8, the azimuth section detector 6 produces a selecting signal and sends it through a buffer 10 to select one of 20 wired programs in an intensity select logic circuit 12. Twenty wired programs is an arbitrary example, the number used may vary as desired.

Each program represents a particular azimuthal sector of the terrain to be scanned by a radar beam as a simulated aircraft "flies" over the terrain. A selected program will be fed out of intensity select logic 12 as a digital signal to a digital-to-analogue intensity generator 14 in a manner modified by an input signal to 12 on a line 15 from a video time buffer 50 which receives the output of a video decoder 48. The signal on line 15 is a function of aircraft velocity (the simulated aircraft in which the radar display is located), antenna scanning direction, and other variables.

Digital-to-analogue intensity generator 14 converts the digital signal from 12 (representing a selected sector of terrain) to a varying voltage proportional to terrain elevation as seen by a radar sweep on a given antenna azimuth. The analogue signal from 14 is fed to a variable gain amplifier 16 to modulate a signal from a ground return noise generator, not shown, to produce a ground return video signal. This signal is fed to a second variable gain amplifier 18 where it is modified by an intensity control signal from an instructor's station, not shown, and a signal representing aircraft altitude. The modified video signal is fed from amplifier 18 through a lobe gating circuit 20 where it is gated by antenna main and side lobe pattern signals from the radar simulator. The video signal from lobe gating circuit 20 is fed to a vertical aspect and shadow generator 22 where it is modified by a ground return reflectance function and a shadow effects function. The output of 22 is the ground return video signal which is fed to the radar simulator display to add the effects of ground return to the display.

Thus the ground return video signal which appears as background on the simulator display is a function of the selected azimuth terrain sector, aircraft position over the sector, aircraft heading, velocity, elevation, antenna angle, antenna radiation effects (main and side lobe), and shadow gating effects. Thus a trainee at the radar display observes a vastly more realistic simulation than was attainable with prior art devices.

In the preferred embodiment a ground area was selected representing the area of antenna scan and 60 miles of range. This range is arbitrary and could be expanded. As the aircraft flies over a selected sector, the ground return signal changes as a function of the changing position of the aircraft. Aircraft position information is maintained by a flight position counter 24. Flight position counter 24 is activated by information signals on a line 23 from a counter advance logic circuit 26. Counter advance logic circuit 26 receives timing signals on a line 25 from a flight position counter timing circuit 28. Logic circuit 26 also receives information signals on a line 27 from a pulse storage circuit 30, on a line 29 from a signal conditioning circuit 32 which conditions a scanning direction signal, and on a line 31 from a signal conditioner 34 which conditions an acquisition-track signal. Flight position counter timing circuit 28 is operated by the simulator sweep gate signal which passes through a buffer 36 and a display gate delay circuit 38 to synchronize the system. A system clock 40 also receives the sweep gate signal from buffer 36 and forwards clock signals over a line 41 to display gate counter 42 and a video counter 44. Counter 42 is enabled by a signal from display gate delay 38 over an enable line 43 and is reset by a signal from flight position counter timing circuit 28 over a reset line 45. Display gate counter 42 receives count representing signals from flight position counter 24 through transfer logic circuit 46. Pulse storage circuit 30 stores pulse signals from 54 representing aircraft velocity and forwards them to counter advance logic circuit 26. The aircraft velocity signal is first converted to an analogue signal in a converter 52 and changed to a pulse frequency signal in an analogue to frequency converter 54.

The sequence in which the program is gated to the digital-to-analogue intensity generator 14 is controlled by the signal on line 15 to the intensity select logic circuit 12. This signal comes from video counter 44 and is decoded in the video decoder 48 and passed by the video time buffer 50 to intensity select logic 12. The video counter 44 is arranged to divide the period of each 60-mile B-sweep into 64 increments of time. During each of the 64 time increments, the signal output from the digital-to-analogue intensity generator 14 may be changing in amplitude in the sequence determined by the selected one of the 20 wired programs stored in the intensity select logic circuit 12. The video counter is enabled by the display gate counter 42 at a time determined by the count stored in flight position counter 24. The count in the flight position counter 24 is a function of the distance the aircraft has flown. This count is gated to display gate counter 42 through transfer logic circuit 46 in response to a transfer signal from the flight position counter timing circuit 28 prior to the enabling of the display gate counter. Thus the display gate counter provides a variable delay for starting the generation of the video signal. This makes the area of video required available during the indicator display time.

The circuit details of the various elements shown as blocks in the drawing are not essential to the invention. The exact construction of the various elements may vary with different simulators. Various expedients for accomplishing the functions taught will suggest themselves to persons skilled in the art. Counter advance logic 26 may be any arrangement of logical elements which will respond to the scan direction, acquisition-track, and aircraft velocity inputs and periodically (in response to flight position timing circuit 28) forward consolidated information to flight position counter 24. The scan direction and acquisition-track signals may be two state signals. The aircraft velocity is converted from analogue in 54 to a frequency which may be temporarily stored in 30 to adapt to the requirements of 26. Periodically the flight position counter timing circuit 28, which is controlled by a delayed sweep gate signal from 38, enables transfer logic to transfer the count from flight position counter 24 to display gate counter 42. Counter 42 may count up (or down depending on whether the count from 24 is complimented). Video decoder 44 may respond to the count-out of 42. Video decoder 48 converts the count in 44 to a serial pulse train which is buffered in 50. The details of the lobe gating circuit 20 and the vertical aspect and shadow generator are not part of the invention. They comprise circuits known in the art and are shown to illustrate the environment of the invention more completely.

There has been shown and described a circuit for realistically simulating the effects of ground return on the display of a radar simulator training device. The invention greatly enhances the realism and thus the training effect of prior art radar training devices.

We claim:

1. In a radar simulator training device, having a radar display, the improvement comprising means for simulating the effect of ground return on said display, said means comprising a plurality of stored programs each representing a respective azimuthal sector of terrain, means for storing said programs, means for selecting a particular program, and means for presenting a ground effect modified by said selected program on said radar display.

2. The apparatus of claim 1 wherein said means for selecting a particular program include a variable voltage generator means for developing a voltage to simulate scanning by a radar antenna, a reference voltage means, an azimuth section detector means, said azimuth section detector means being arranged to compare said variable voltage with said reference voltage to develop a selecting signal for selecting a particular program stored in said storing means.

3. The apparatus of claim 2 wherein said means for presenting a ground effect modified by said selected program include means for further modifying said ground effect in accordance with noise effects, altitude effects, and radar intensity effects.

4. The apparatus of claim 3 and including means for receiving an aircraft velocity signal from said radar simulator, means for receiving an antenna scan direction signal from said radar simulator, means for receiving an acquisition-track signal from said radar simulator, and means for combining said signals into a composite signal, means connecting said combining means to said storing means whereby said composite signal is applied to said storing means to enable said storing means to forward a signal to said means for presenting a ground effect, said forwarded signal representing a selected program as modified by said composite signal.

5. The apparatus of claim 4 wherein said combining means include a flight position counter for maintaining a record of aircraft position as modified by said aircraft velocity signal.